US007182174B2

(12) United States Patent
Parrini et al.

(10) Patent No.: US 7,182,174 B2
(45) Date of Patent: Feb. 27, 2007

(54) METHOD AND SYSTEM FOR EMERGENCY EVACUATION OF BUILDING OCCUPANTS AND A METHOD FOR MODERNIZATION OF AN EXISTING BUILDING WITH SAID SYSTEM

(75) Inventors: Lorenzo Parrini, Affoltern A/Albis (CH); Peter A Spiess, Meggen (CH); Kilian Schuster, Ballwil (CH); Lukas Finschi, Lucerne (CH); Paul Friedli, Remetschwil (CH)

(73) Assignee: Inventio AG, Hergiswil (CH)

( * ) Notice: Subject to any disclaimer, the term of this patent is extended or adjusted under 35 U.S.C. 154(b) by 209 days.

(21) Appl. No.: 10/737,249

(22) Filed: Dec. 15, 2003

(65) Prior Publication Data

US 2004/0163325 A1 Aug. 26, 2004

(30) Foreign Application Priority Data

Dec. 23, 2002 (EP) .................................. 02406132

(51) Int. Cl.
*E06C 5/34* (2006.01)
*G05B 15/00* (2006.01)

(52) U.S. Cl. .................. 182/18; 187/247; 340/286.01; 700/83

(58) Field of Classification Search .................. 182/18; 187/247, 390, 391, 392, 395, 399; 340/825.19, 340/825.31, 825.32, 825.06, 286.05, 286.01, 340/521, 522, 524, 944, 925; 700/83, 275
See application file for complete search history.

(56) References Cited

U.S. PATENT DOCUMENTS

| | | | | |
|---|---|---|---|---|
| 4,023,146 | A | 5/1977 | Carroll | |
| 4,074,225 | A * | 2/1978 | Vandeweghe | 340/524 |
| 4,531,114 | A * | 7/1985 | Topol et al. | 340/539.1 |
| 4,852,696 | A * | 8/1989 | Fukuda et al. | 187/392 |
| 5,979,607 | A * | 11/1999 | Allen | 187/390 |
| 6,000,505 | A | 12/1999 | Allen | |
| 6,196,355 | B1 * | 3/2001 | Fargo et al. | 187/393 |
| 6,206,142 | B1 * | 3/2001 | Meacham | 187/392 |
| 6,529,128 | B2 * | 3/2003 | Weng | 340/539.1 |
| 6,615,175 | B1 * | 9/2003 | Gazdzinski | 187/396 |
| 6,778,071 | B2 * | 8/2004 | Megerle | 340/332 |
| 6,828,918 | B2 * | 12/2004 | Bowman et al. | 340/825.19 |
| 6,873,256 | B2 * | 3/2005 | Lemelson et al. | 340/539.1 |

* cited by examiner

*Primary Examiner*—Hugh B. Thompson, II
(74) *Attorney, Agent, or Firm*—Klaus P. Stoffel; Wolff & Samson, PC

(57) ABSTRACT

A method and a system for emergency evacuation of building occupants and to a method for modernization of an existing building with the evacuation system. The system is used in a multi-story building having a plurality of floors and with at least one elevator positionable at selected landings of the floors. A first device is provided for measuring the number of persons in the building and a second device is provided for detecting an emergency condition in the building. At least one control unit is provided for determining or for estimating a number of building occupants in the building. The control unit defines at least one evacuation zone in the building during the emergency condition. Based on this information, the control unit defines at least one designated floor in the building during the emergency condition. Then the system evacuates the building occupants with the elevator car and/or a stairway from the evacuation zone to the designated floor.

22 Claims, 4 Drawing Sheets

METHOD AND SYSTEM FOR EMERGENCY EVACUATION OF BUILDING OCCUPANTS AND A METHOD FOR MODERNIZATION OF AN EXISTING BUILDING WITH SAID SYSTEM

BACKGROUND OF THE INVENTION

The present invention relates to a method and a system for emergency evacuation of building occupants and to a method for modernization of an existing building with the system that allows the use of an elevator as a means of reliable egress and evacuation during emergency of a multi-story building having a plurality of floors.

Traditionally, an elevator is not considered as a reliable means of egress during a building fire. Notices like "Do not use elevator in case of fire" can be found commonly to notify the building occupants to refrain from using the elevator and to use instead a stairway.

European standard EN81-73 provides a regulation for a safe and reliable egress and evacuation during fire in a building by using an elevator. The elevator comprises a fire alarm function, which is initiated by a fire alarm system. Dependent upon the fire alarm system and the management of the fire alarm, different reactions of the elevator are foreseen. For example, after sent into fire alarm condition, the landing and car call buttons are rendered inoperative and the elevator car is automatically recalled to a designated floor of the building. The elevator is parked with the doors open and the elevator is temporarily taken out of service. Then, the fire department can override the fire alarm function by activating a fire department key switch to utilize the elevator car individually.

EN81-73, however, does not deal with the ongoing use of the elevator after a fire has been detected and will be fought. Especially in buildings with more than six floors, the fire department personnel must use also the stairway to advance on the fire and will be hindered by people, who are escaping by using the stairway. Also, EN81-73 does not refer to the generally unsafe environment for building occupants, such as smoke, heat and/or water in the building. In particular, the unsafe environment concerns the hoistway, the landing doors and the stairway. One significant reason that an elevator may not be used for emergency egress during a building fire is the danger presented by smoke. Smoke at the hoistway door will be interpreted by the elevator control as an obstacle, preventing thereby the door from closing properly. Smoke also contains toxic gases and combustion products, which create an untenable environment for people and expose them to increased risk. Water from automatic fire sprinklers or from fire department hoses can enter the hoistway and short circuit the car controls. Moreover, not only young and healthy but also non- ambulatory and disabled people search egress from the building. These building occupants cannot use the stairway and are, therefore, forced to remain in the burning building until rescued by the fire department. Finally, EN81-73 does not consider the chaotic environment and irrational psychological reactions of the building occupants, which increases the time required to evacuate the building and results in panic and injury to themselves and others.

U.S. Pat. No. 6,000,505 refers to a multiple level building with an elevator operable as a means of emergency egress and evacuation during a fire accident, which overcomes some of the before-mentioned problems and provides benefits. U.S. Pat. No. 6,000,505 discloses a system characterized by the use of smoke detectors, which is limited to the case of fire and does not consider other emergency situations requiring an evacuation with elevators, such as bomb scare, terrorist attack, hurricane, flood, or an earthquake. Furthermore, this system is automatic, but not intelligent and cannot take into account how many people are waiting to be saved on a determined floor and whether among these people some are handicapped. Moreover, this system is not flexible and not able to calculate special and faster strategies to evacuate all people in a building with the elevator. A further shortcoming of this system is that it does not consider the irrational psychological reactions of people submitted to a highly stressful emergency situation. Because an elevator is conceptualized as unsafe during emergencies, the use of an elevator during an emergency is likely to be perceived as high risk. People will, therefore, refrain from using the elevator. Moreover, a sign placard located within the elevator car and at each elevator lobby, such as shown by FIG. 8 of U.S. Pat. No. 6,000,505 is clearly insufficient to guide panicked people into an elevator during an emergency situation.

SUMMARY OF THE INVENTION

Accordingly, it is an object of the present invention to provide a method and system for emergency evacuation of building occupants, which does not exhibit the above-mentioned shortcomings, but allows an efficient and pondered evacuation even in panic situations.

In a first embodiment of the invention, a multi-story building having a plurality of floors with at least one elevator positionable at selected landings of the floors comprises first means for measuring persons in the building, and second means for detecting an emergency condition in the building. At least one control unit is provided for determining a number of building occupants in the building and for defining at least one evacuation zone in the building during the emergency condition. Based on this information, the control unit defines at least one designated floor in the building during the emergency condition. Then the system evacuates the building occupants with the elevator car and/or stairway from the evacuation zone to the designated floor.

In a second embodiment of the invention, a multi-story building having a plurality of floors, with at least two elevators that are positionable at selected landings of the floors comprises second means for detecting an emergency condition in the building. At least one control unit is provided for defining at least one evacuation zone in the building during the emergency condition and for defining at least one designated floor in the building during the emergency condition. The system evacuates the building occupants with at least two elevator cars being positioned at one and the same floor in the evacuation zone having the doors opened.

It is an advantage of the present invention, that it allows in the first embodiment a precise determination of the number of building occupants and that in the second embodiment it uses an estimated determination of the number of building occupants. Preferably, according to the first embodiment, the first means may be a car load detector and/or destination call identification device wherein the entry location of a call is the starting floor, the call is fed into the control unit and allocated to an elevator, and the elevator user is then transported from the starting floor to the destination floor. The number of elevator users transported to destination floors is counted and stored in a memory. Of course, first means destination identification devices or car load detectors can also be installed at the entrances of stairways and escalators, allowing the control unit to also count and identify people not acceding to the building with the elevators. By assuming that all transportation within the building occurs by destination call identification, the control unit always knows exactly the number of building occupants present at each floor.

The destination call may be entered at a landing fixture or read from an identification medium, like a tag or card. This last option exhibits the advantage that personal identification codes can be stored in the identification card and transmitted to the control unit at the moment of the elevator call. In this way the control unit can detect and control the position in the building of disabled persons, VIP, children and any other category of people and can use this information to calculate and prioritize the evacuation procedures.

In an advantageous embodiment of the invention, the control unit can detect which kind of emergency has occurred, for example fire, bomb scare, terrorist attack, flood, earthquake, hurricane. It is an advantage of this embodiment of the invention that it allows to link the number of building occupants with the emergency condition detected in the building. It is therefore possible, to define an evacuation zone and a designated floor in accordance with the number of building occupants in each floor. Because the number of building occupants within the evacuation zone is known, the most suitable designated floor and the fastest emergency evacuation procedure using stairways and the elevator can be defined.

It is another advantage of the present invention, that it allows in the second embodiment avoids the problems originating from a situation of panic in a multitude of frightened people. In this case, preferably all elevator cars open their doors synchronously at a floor in the evacuation zone, allowing the largest number of people to enter into the elevators at the same time. This procedure avoids the well-known inconvenience occurring in panic situations, that people crowd together into an elevator car, preventing the elevator doors from closing and preventing the elevator car from leaving the floor and rescue the people. If one floor at a time is evacuated in this way, people waiting in the evacuation zone can be rescued with an efficiency and rapidity superior to other evacuation procedures.

These aspects and advantages of the present invention, as well as others, will become apparent from the following description of the preferred embodiments which refer to the accompanying drawings.

DETAILED DESCRIPTION OF THE INVENTION

Figure 1:
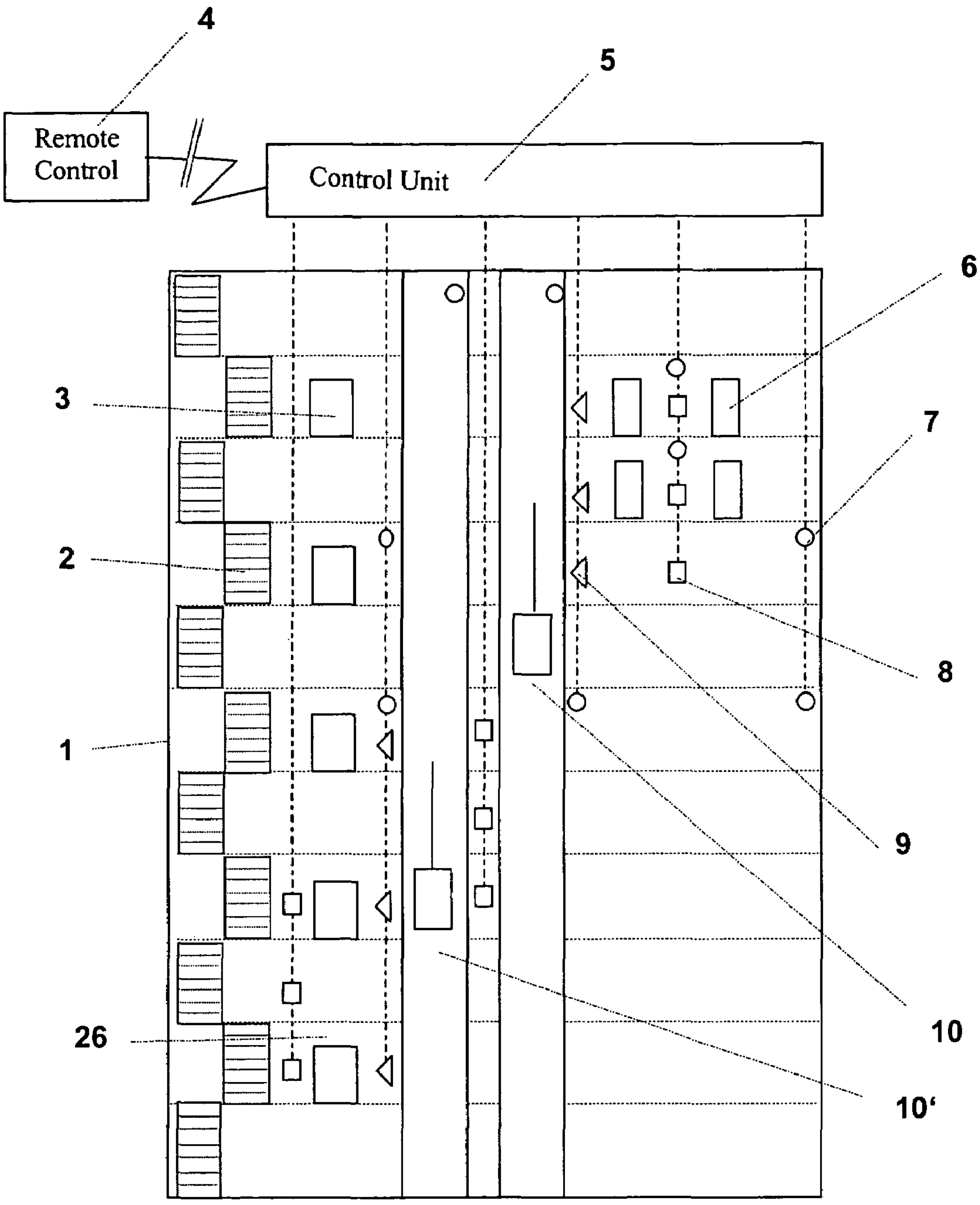
FIG. 1 is a sectional view of a multi-story building with a preferred embodiment of a system according to the invention.

FIG. 1 depicts a multi-story building 1 with a preferred embodiment of a system according to the invention. The building users and occupants have access and egress to the building either by the stairways 2 or by the elevators 10, 10'. The elevators 10, 10' may be a single one, one of an electrically interconnected group of elevators, or the cars may be multi-deck. The elevator car is positionable at selected landings 26 of the floors. Access from and to the elevator at the landing occurs via doors 3. The landing is a building zone being e.g. the ground floor lobby, a sky-lobby or a part of a floor passage. The elevator hoistway doors 3 give access to the different floors of the building, in which building doors 6 serve to connect different rooms and spaces. The elevators 10, 10' are controlled and driven by a control unit 5, which can consist, for instance, in a computer or a group of computers connected with the elevator drives and motors. The control unit 5 can be advantageously connected with a remote control unit 4 in a remote service center, a police station, a fire station or a remote building management center. In this case the elevators 10, 10' and even other elements of the building 1, such as the doors 6, the lights or the windows, can be remotely controlled in the case of an emergency via the public telephonic lines, personal computers, the Internet or cellular mobile telephones. A remote building, where the real time remote supervision, control and activation of the required emergency category algorithms of the elevators in the building 1 can take place, significantly increases the safety level of the proposed elevator evacuation system.

Second means 7 for detecting an emergency condition in the building are spread and mounted in each part and floor of the building 1 and are connected to the control unit 5. These apparatuses are devices apt to detect the presence of fire, such as smoke, heat or temperature sensitive sensors. The sensors are placed preferably in each room and lobby of the building 1. They are also installed in the elevator car, in the elevator hoistway, in the elevator machine room, at the landings in each floor, and also preferably integrated in the elevator car doors and in the elevator hoistway doors, so that the presence of a danger in the elevator system can be immediately detected and neutralized.

In order to detect the emergency of an earthquake, devices sensitive to displacement and vibrations must be placed and distributed on the structural walls and elements of the building 1. In order to detect the emergency of a hurricane, devices sensitive to air displacements and wind must be placed and distributed on the outer walls of the building 1 and in the rooms of the building close to the windows. In order to detect the emergency of flood, devices sensitive to the presence of water must be mounted at least in the lower stories of the building 1 close to the floor surface. Means to detect crowd and people also play an important role in our invention and are placed at the landings and in the elevator cars.

When an emergency of bomb threat or terrorist attack occurs in the building 1, the elevator emergency evacuation is manually or remotely activated preferably by the input of a code number identifying to the emergency situation concerned. There are separate identification code numbers for each type of emergency situation. Several multi-media panels 8 are distributed in the building 1 and connected to the control unit 5, in order to collect the input of the identification code numbers concerning an emergency situation. The panels 8 incorporate audible and visual communication systems, such as loud speakers, blinking signs, direction arrows, illuminated indicators and pictograms, monitors, which have the function to guide and direct people into the elevator cars or to the stairways during an emergency evacuation procedure.

Figure 3:
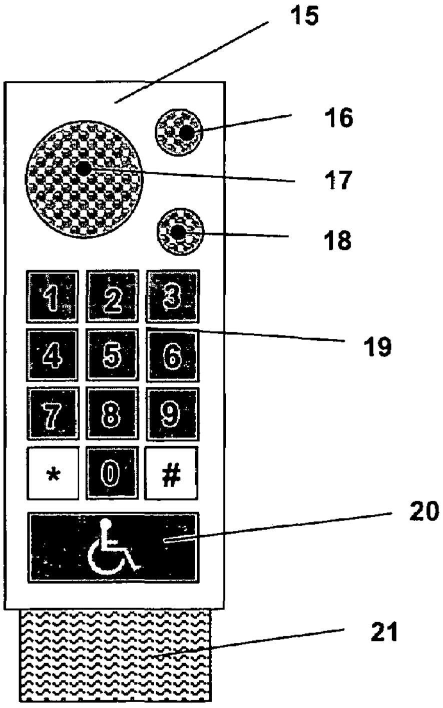
FIG. 3 is a schematic representation of a preferred embodiment of a fixture for use with the present invention.

First means 9 are provided for measuring a number of persons acceding/leaving the elevator car. First means 9 are preferably devices for entering destination calls and are provided at each floor at the landings, in order to allow the passengers to place elevator calls for a predetermined floor. The control unit can in this way determine the number of building occupants in the building and in each floor of the building. A preferred embodiment of the destination call identification device consists of a fixture with a ten digit keypad or of a contactless identification system and is illustrated in FIG. 3. The first means may be also identification devices situated in front of access/egress from/to stairways and escalators, allowing therefore to count and to identify people taking the stairways or escalators. Instead of entering destination calls, the first means allow in this case access/egress of people from/to stairways and escalators and inform the control unit accordingly. The first means 9, however, can be even a simple car load detector installed in the elevator car, which allows the number of people entering into an elevator and acceding to a determined building floor to be roughly estimated.

Following an emergency condition alarm, the elevator system is switched from a normal operation mode to an emergency evacuation mode via the control unit 5. The emergency condition alarm indicating an emergency condition in the building is generated either automatically by the second means 7, manually using the panels 8 or the first means 9 or remotely by remote means. Remote means are the control unit 4, a personal computer, Internet, a telephone, a mobile telephone or a sms (short message). Each emergency condition like fire, earthquake, hurricane, flood, bomb scare or terrorist attack is identified by a code number and may be selectively activated by the dedicated identification code number manually via a keypad 19 (FIG. 3) or remotely by remote means.

In the emergency evacuation mode a ground floor 11 of the building 1 is defined, which allows people to reach easily the building exit on foot without the intervention of any mechanical or artificial means. The ground floor 11 can be the exit floor or represented also by a group of the lower floors of the building 1, from which the egress is very easy, as shown in FIG. 2.

The floor in which the alarm signal has been generated is defined as the emergency floor 12. Of course, the emergency floor can consist of many floors of the building 1, if the emergency condition is detected at several points in the building.

Based on the type of emergency, on the people count, on the position of the ground floor 11 and on the position of the emergency floor 12, the control unit 5 establishes at least one evacuation zone 13, grouping all building floors where people are in danger and require to be rescued as soon as possible.

In the case of fire the evacuation zone 13 consists of all building floors above the emergency floor. In the case of flood the evacuation zone 13 consists of all building floors below the emergency floor. In the case of hurricane the evacuation zone 13 consists of all building floors above the ground floor. In the case of earthquake the evacuation zone 13 includes all building floors. In the case of bomb scare or terrorist attack the evacuation zone 13 is limited to a certain number of building floors above and below the emergency floor.

Based on the type of emergency, on the people count, on the position of the ground floor 11 and on the position of the emergency floor 12, the control unit 5 establishes also an evacuation designated floor 14, where the building occupants must be transported in order to be considered in a safe location.

In the case of fire the evacuation designated floor 14 is situated some floors below the emergency floor. In the case of flood the evacuation designated floor 14 is situated some floors above the emergency floor. In the case of hurricane the evacuation designated floor 14 is situated some floors below the ground floor. In the case of earthquake the evacuation designated floor 14 is the ground floor. In the case of bomb scare or terrorist attack the evacuation designated floor 14 is situated a certain number of building floors below the emergency floor.

Figure 2A:
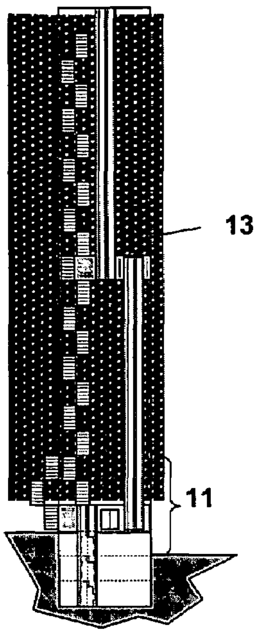
FIG. 2 is a schematic representation showing different building evacuation modes of the system of FIG. 1 under different emergency situations.

Depending on the people count, the location of the ground floor 11, the location of the emergency floor 12, the location of the evacuation zone 13 and the location of the designated floor 14, the control unit can carry out different modes of building evacuation with elevators, as shown in FIG. 2:

Full building evacuation, when all floors of the building must be evacuated, like in the emergency situation of an earthquake (FIG. 2*a*).

Figure 2B:
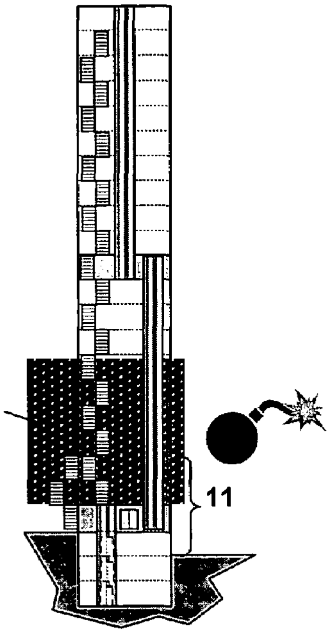

Zone evacuation, when all floors of the building between two determined floors must be evacuated, like in the emergency situation of a bomb scare (FIG. 2*b*).

Figure 2C:
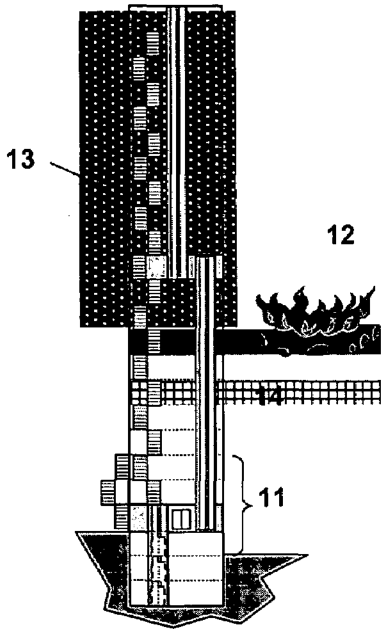

Jump evacuation, when all floors of the building between two determined floors must be evacuated, and one danger zone of the evacuation zone is excluded from evacuation, like in the emergency situation of fire (FIG. 2*c*).

Selective evacuation, when only some specific floors of the building are evacuated, like in the case of floors in the evacuation zone with disabled persons, vip or children.

During full evacuation, all building occupants present in the building are evacuated. During zone evacuation, only building occupants within the evacuation zone are evacuated. During jump evacuation, at least one danger zone of the evacuation zone is excluded from evacuation. During selective evacuation, disabled people and/or children and/or vip persons and/or all other persons having a special identification among the building occupants are evacuated with priority. This priority evacuation can be from the entry floor directly to a safe building exit floor to avoid disabled people and children from having to use the stairs. In particular, during selective evacuation, disabled people and/or children and/or vip persons and/or all other persons having a special identification among the building occupants can be evacuated to a designated floor having a disabled-useable exit of the building, e.g. an exit without obstacles representing architectonic barriers for disabled people, like stairs or steps.

FIG. 3 illustrates a preferred embodiment of a fixture 15 comprising a destination call identification device used in this invention. The fixture 15 is located at each landing and incorporates e.g. a ten digit keypad 19 containing numbers, a sensor 16, a loud speaker 17, a microphone 18, a special key 20 for disabled persons and an identification medium reader 21.

The elevator users can place a destination call either by typing in the number of the floor at which they want to land with the ten digit keypad 19, or in a contactless manner by approaching an identification medium like a card, preferably without any contact, to the identification medium reader 21. The identification card stores an identification code. When the card approaches the identification medium reader 21, this code can be detected by the identification medium reader via optical, magnetic or electromagnetic means, and transmitted to a data base of the control unit 5, where personal data of the user, like name, access rights, evacuation priority rank in case of emergency, normal destination call floor, are stored. The control unit 5 can in this way count and store in a memory the number of people landing and occupying a certain building floor. In the case of the use of the identification medium, the control unit 5 can even detect and control the presence of each singular individual in each of the building floors. This information is then used and processed in the case of an emergency evacuation with elevators. The fixtures 15 can be also located in front of access/egress from/to stairways and escalators, allowing therefore to count and to identify people taking the stairways or escalators.

The sensor 16 is typically a smoke or temperature sensor, which checks whether the access to the landing is safe or not. It can also be a crowd sensor. The loud speaker 17 informs the passengers waiting to be rescued at the landing, whether that elevator is safe or not. The microphone 18 is used by the passengers waiting in the landing to announce to the control unit 5 and/or to the remote control unit 4 that an emergency situation is occurring. The special key 20 is provided to communicate to the control unit 5 that a disabled person is acceding to the elevator car. The control unit 5 will therefore add in its memory a disabled person to the person counter of the destination call floor selected by the disabled person.

In the case of an emergency evacuation with elevators, it is important to alert the building occupants with the maximal rapidity, that they must leave the building immediately using the elevators. It is also important, that the evacuation takes place calmly, peacefully and smoothly, avoiding panic situations and crowding.

Figure 4:
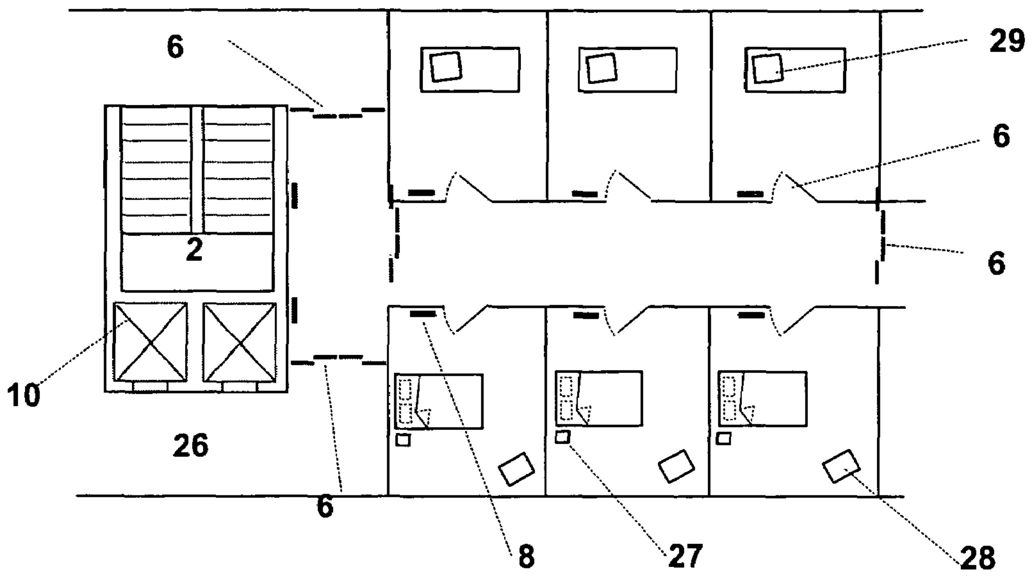
FIG. 4 is a lay-out of a building floor with the representation of the signaling means used to alarm the building occupants in the case of an emergency situation as used in the present invention.

FIG. 4 is a lay-out of a building floor with the representation of the signaling means used to alarm the building occupants in the case of an emergency situation as used in a preferred embodiment of the present invention. The building occupants are alerted that they must leave the building with the elevators via the panels 8 and/or the telephones 27 and/or the televisions 28 and/or the personal computers 29. The signaling means can also report which kind of emergency occurs, when the building occupants must leave their rooms and offices and how they should behave. In order to avoid a panic situation and in order to avoid dangerous crowding in the elevators 10, stairways 2 and landings 26, the evacuation signal is transmitted with a slight delay to the occupants of different building floors. The alarm can be sequential and/or selective. The control unit 5 can also open and close the building doors 6 automatically and dose the transfer of people from their rooms and offices to the landing 26, preventing a dangerous crowding in the elevator 10 and the landing 26.

The control unit can also dose, distribute and direct evacuating occupants of different building floors alternatively to the stairways 2 or to the elevators 10, in order to prevent crowding. Building occupants can be directed and guided by the stairway to a floor in the evacuation zone to be evacuated by elevators and/or building occupants can be directed and guided by a stairway or at least one escalator from the designated floor to the ground floor and/or to a building exit.

Audio and/or visual indicating means play a crucial role in directing and guiding people during an emergency evacuation, which has to be dosed and controlled.

Figure 5:
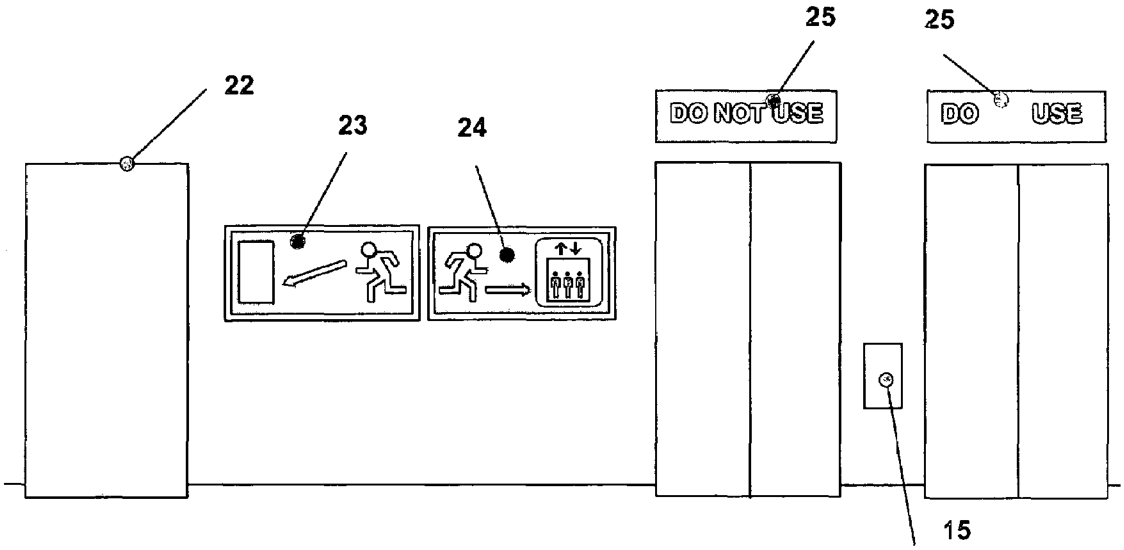
FIG. 5 is a dynamic floor lay-out signalization located at a building floor for use with the present invention.

FIG. 5 shows the audio and visual indicating means to direct and guide people to the elevators 10 or to the stairway doors 22 in the case of an emergency evacuation, as provided in an exemplary embodiment of the present invention.

A visual and, if necessary, an audible use status indicator 25 of the elevator, which points out whether the elevator is safe to use or not by passengers waiting for emergency evacuation, is placed preferably above the elevator hoistway door frame. The indicator is able to constantly monitor the safety situation of the elevator system at all times, including being active when there is an electrical power failure. The indicator display is dynamic and clearly displays whether the elevator is safe to use or not, for emergency evacuation, i.e. it must display, as a minimum, the text "Do not use the elevator for evacuation" or "Do use the elevator for evacuation". The text can be displayed in the appropriate local language or in the form of a pictogram. The indication must be clearly visible and may flash. Audible indication may also be included to cater for any blind persons who may need to be rescued. An audible count-down that informs the building occupants waiting to be rescued by the elevators at the landings about the remaining time for elevator arrival contributes enormously to calm the waiting people.

If the control unit 5 detects a certain elevator as safe during an emergency condition, in order to direct and guide people, who are not at the landings, indication panels 24 will be lighted up or will blink in the building corridors and passages. These will point out where the lobby of the elevator to be used for evacuation is. If the control unit 5 detects certain elevators as unsafe during an emergency condition, in order to direct and guide people, indication panels 23 will be lighted up or will blink in the building corridors and passages. These panels 23 will point out where the doors 22 of the stairways to be used for evacuation are.

In order to prevent crowding, the control unit doses, distributes and directs evacuating occupants of different building floors alternatively to the stairways 2 or to the elevators 10 by using respectively the indication panels 23 for the stairway or the indication panels 24 for the elevator.

Figure 6:
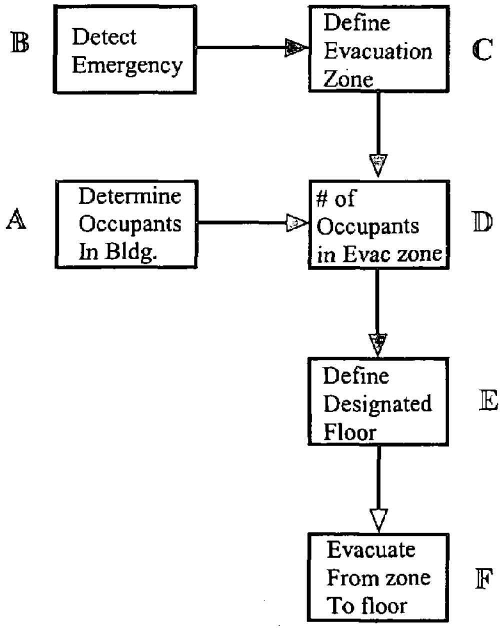
FIG. 6 is schematic flow chart illustrating an exemplary evacuation sequence in accordance with one embodiment of the present invention.

FIG. 6 shows a flow chart of an evacuation sequence comprising:

A. Determining a number of building occupants in the building;

B. Detecting an emergency condition in the building;

C. Defining at least one evacuation zone 13 in the building during the emergency condition;

D. Defining a number of building occupants in the evacuation zone;

E. Defining at least one designated floor 14 in the building during the emergency condition;

F. Evacuating with the elevator car and/or stairway the building occupants from the evacuation zone to the designated floor.

The steps A and D can be carried out precisely by means of a destination call identification device, e.g. with a ten digit keypad 19 or with an identification medium reader 21. The steps A and D can be carried out, however, also very simply by means of a car load detector installed in the elevator car, which allows the number of people entering into an elevator and acceding to a determined building floor to be roughly estimated. The car load can be measured for determining a number of building occupants in the building and/or the number of destination calls or identification codes requiring floor access are counted for determining a number of building occupants in the building.

The steps B, C and E have been already described above.

Concerning the step F, several strategies and dosing criteria are imaginable to evacuate the building occupants from the evacuation zone to the designated floor using the elevator cars and/or stairways.

If the emergency is, for example, that of fire, all elevators containing persons automatically travel to the designated floor 14. If this floor is also on fire, another floor is automatically selected. Upon arrival at the designated floor 14, passengers are allowed to leave the car.

Empty cars will automatically travel to the evacuation zone 13 and open their doors to collect people to be evacuated. In emergency situations, when a crowd in panic is supposed to fill up the elevator car and instead prevents the elevator doors from closing, some expedients can be used which nevertheless allow the elevator doors to close. For example, electrical shocks generated by the elevator and/or sudden mechanical movements of the elevator car scare people and permit the elevator doors to close.

In a preferred embodiment of the present invention, the building occupants are evacuated from the evacuation zone to the designated floor by at least two elevators (10, 10'), elevator cars of said elevators being positioned at one and the same floor in the evacuation zone and having the doors opened. In this way, people can be distributed in at least two elevator cars. This procedure avoids the inconvenient occurrence in panic situations, that people crowd together into one elevator car, preventing the elevator doors from closing and preventing the elevator car from leaving the floor and rescuing the people. This evacuation procedure exhibits advantages even if the steps previously mentioned A. and D. are not performed, and the number of building occupants is not determined.

This evacuation procedure can be optimized if each floor in the evacuation zone to be evacuated by elevators is evacuated by a number of elevator cars having a total load capacity corresponding to an estimated load of the number of building occupants present in said floor. The floors in the evacuation zone to be evacuated by elevators can be evacuated sequentially, starting with the region in the emergency zone of high danger for building occupants. Preferably each floor in the evacuation zone to be evacuated by elevators is evacuated only once.

Audio and/or visual indicating means 23, 24, 25 clearly point out to waiting persons whether the elevator is safe or not safe to use and guide people to the elevators or stairways. Once the passengers have entered the elevator, it will travel through the fire emergency floor 12 to the safe designated floor 14 below the fire, to allow the passengers to exit and use the safety stairs 2 for the rest of the evacuation journey. The evacuation zone 13 and the designated floor 14 may be dynamically remotely adjusted according to how the emergency situation develops.

The elevators will then return to the evacuation zone 13 to collect more persons. Different strategies can be implemented to stop the elevators in the evacuation zone. All elevators can for example reach a floor in the evacuation zone, open their doors at the same time and evacuate sequentially each building floor only once. But an elevator can also stop at floors where persons have indicated that they are waiting, via an input request given at the respective floor control panel fixtures 15.

The fixtures 15 also contain a special key 20 for use by disabled persons, in conjunction with a password. When such a key is activated and the use status indicator 25 shows that the elevator is safe to use, the disabled person may enter and be safely evacuated by direct travel of the elevator car to the ground floor 11 of the building. This saves the disabled person(s) from having to use the stairways 2 below the designated floor 14 for the evacuation journey.

Once all the persons in the evacuation zone 13 have been rescued, the elevators will automatically collect waiting persons at the highest floor below the fire and deliver them directly to the designated floor 14 or alternatively to the ground floor 11.

The emergency evacuation mode may only be cancelled by the input of a password identity code or similar means by an authorized person.

During an emergency evacuation with elevators, it is possible that an elevator being used for evacuation becomes unsafe in consequence of the propagation of the catastrophic event.

If an elevator, while travelling towards a floor where people are waiting to be rescued, becomes unsafe, the indicators 25 will show “Do not use the elevator”. Also, if the elevator is in the process of arriving at a floor where passengers are waiting and goes into the unsafe mode, the doors will remain closed to prevent entry of persons.

The indicator 25 is connected to various devices, which monitor the safety status of the elevator in the elevator car, hoistway, machine room and at the landings 26. The destination call system does not need any input station within the car. Various safety features may be overbridged during an emergency evacuation.

Destination floors, which become unsafe during an emergency may be taken out of service either automatically, manually or remotely, by the rescue or building management system or by the input of a respective floor code.

An existing elevator or elevator group in a multi-story building 1 can be easily modernized with a system for emergency evacuation of building occupants, such as that described in the present invention.

First means 9 for measuring a number of persons and second means 7 for detecting an emergency condition in the building must be installed, if they are not already available in the elevator system. A control unit 5 for determining a number of building occupants in the building must be provided, or an already existing control unit must be adapted accordingly. The necessary electrical connections and interfaces must be configured. The control unit then defines at least one evacuation zone 13 and at least one designated floor 14 in the building during the emergency condition. The building occupants are evacuated during the emergency condition with the elevator car and/or stairway from the evacuation zone to the designated floor.

Without further analysis, the foregoing will so fully reveal the gist of the present invention that others can, by applying current knowledge, readily adapt various applications without omitting features that, from the standpoint of prior art, merely constitute essential characteristics of the generic or specific aspects of this invention.

What is claimed is new and desired to be protected by Letters Patent as set forth in the appended claims.

What is claimed is:

1. A method for emergency evacuation of building occupants from a multi-story building having a plurality of floors, a stairway and at least one elevator with an elevator car positionable at selected landings of the floors, the method comprising the steps of:

determining substantially the total number of building occupants in the building by a destination call identification device, from which calls are fed into a control unit and allocated to elevators, an elevator user being then transported to a destination floor and the number of elevator users transported to destination floors being counted and stored in a memory;

detecting an emergency condition in the building;

defining at least one evacuation zone in the building during the emergency condition; defining at least one designated floor in the building during the emergency condition; evacuating the building occupants from the evacuation zone to the designated floor via at least one of the elevator car and the stairway.

2. The method of claim 1, wherein the step of evacuating the building occupants from the evacuation zone to the designated floor via at least one of the elevator and the stairway includes at least one of: full evacuation, zone evacuation, jump evacuation, and selective evacuation.

3. The method of claim 2, wherein:

full evacuation includes evacuating all building occupants from the building;

zone evacuation includes evacuating only building occupants present within the evacuation zone;

jump evacuation includes excluding at least one danger zone of the evacuation zone from evacuation; and selective evacuation includes evacuating certain occupants at least one of with priority and to a designated floor having a handicapped exit of the building.

4. The method of claim 3, wherein the certain occupants include at least one of disabled people, children, vip persons, and persons having special identification.

5. The method of claim 1, wherein the step of determining the number of building occupants includes at least one of measuring car load and counting a number of destination calls or identification codes requiring floor access.

6. The method of claim 1, wherein the step of evacuating the building occupants from the evacuation zone to the designated floor takes place by at least two elevators, wherein elevator cars of said elevators are positioned at a common floor in the evacuation zone with their doors opened.

7. The method of claim 6, including at least one of:

evacuating each floor in the evacuation zone to be evacuated by elevators by a number of elevator cars having a total load capacity corresponding to the load of the number of building occupants present in said floor, sequentially evacuating the floors in the evacuation zone to be evacuated by elevators, and evacuating each floor in the evacuation zone to be evacuated by elevators only once.

8. The method of claim 7, including directing and guiding occupants to at least one of the elevator and the stairway with at least one of audio and visual indicating devices.

9. The method of claim 1, further including at least one of directing and guiding building occupants by the stairway to a floor in the evacuation zone to be evacuated by elevators, and directing and guiding building occupants by the stairway or at least one escalator from the designated floor to a building exit.

10. The method of claim 1, wherein the step of determining substantially the total number of building occupants in the building includes providing destination call keypads from which the number of occupants in the building is determined.

11. A method for emergency evacuation of occupants from a multi-story building having a plurality of floors, a stairway, and at least two elevators, each with an elevator car being positionable at selected landings of the floors, the method comprising the steps of:

determining substantially the total number of building occupants in the building by a destination call identification device, from which calls are fed into a control unit and allocated to elevators, an elevator user being then transported to a destination floor and the number of elevator users transported to destination floors being counted and stored in a memory;

detecting an emergency condition in the building;

defining at least one evacuation zone in the building during the emergency condition;

defining at least one designated floor in the building during the emergency condition; and evacuating the building occupants from the evacuation zone to the designated floor with at least two elevator cars being positioned at a common floor in the evacuation zone with their doors opened.

12. The method of claim 11, including at least one of:

evacuating each floor in the evacuation zone to be evacuated by elevators by a number of elevator cars having a total load capacity corresponding to an estimated load of the number of building occupants present in said floor, evacuating the floors in the evacuation zone to be evacuated by elevators sequentially, starting with a region in an emergency zone of high danger for building occupants, and evacuating each floor in the evacuation zone to be evacuated by elevators only once.

13. The method of claim 11, further including directing and guiding building occupants at least one of:

by the stairway to a floor in the evacuating zone to be evacuated by elevators, and by the stairway or at least one escalator from the designated floor to a building exit.

14. The method of claim 13, including directing and guiding building occupants to at least one of the elevator and the stairway with at least one of audio and visual indicating devices.

15. A system emergency evacuation of occupants from a multi-story building having a plurality of floors, a stairway and at least one elevator with an elevator car positionable at selected landings of the floors, comprising:

first means for determining the number of building occupants in the building by a destination call identification device, form which calls are fed into a control unit and allocated to elevators an elevator user being then transported to a destination floor and the number of elevator users transported to destination floors being counted and stored in a memory;

second means for detecting an emergency condition in the building; and the control unit for determining substantially the total number of building occupants in the building, the control unit being operative to define at least one evacuation zone in the building during the emergency condition, the control unit being further operative to define at least one designated floor in the building during the emergency condition, whereby the building occupants are evacuated from the evacuation zone to the designate floor by at least one of the elevator car and the stairway.

16. The system of claim 15, wherein the first means includes at least one of an elevator car load detector, a digit keypad and an identification media reader.

17. The system of claim 15, and further comprising at least one of audio and visual indicating means for directing and guiding people to the elevator or to the stairway.

18. The system of claim 15, wherein an emergency condition alarm indicating an emergency condition in the building is generated at least one of automatically by the second means, manually using the first means and remotely.

19. The system of claim 18, wherein each emergency condition is identified by a code number.

20. The system of claim 15, wherein the first means includes destination call keypads for generating information relative to the number of occupants in the building.

21. A method for modernizing an existing elevator in a multi-story building with a system for emergency evacuation of building occupants, the building having a plurality of floors, a stairway and at least one elevator with an elevator car positionable at selected landings of the floors, the method comprising the steps of:

installing first means for determining the number of occupants in the building, and a control unit, the first means determining the number of building occupants in the building by a destination call identification device, form which calls are fed into the control unit and allocated to elevators, an elevator user being then transported to a destination floor and the number of elevator users transported to destination floors being counted and stored in a memory; and installing second means for detecting an emergency condition in the building, the control unit being operative to define at least evacuating zone in the building during the emergency condition, the control unit being further operative to define at least one designated floor in the building during the emergency condition, whereby the building occupants are evacuated during the emergency condition with at least one of the elevator car and the stairway from the evacuation zone to the designated floor.

22. The method of claim 21, wherein the first means includes destination call keypads.

* * * * *